Oct. 12, 1971  C. W. SHACKELFORD  3,611,633
METHOD AND APPARATUS FOR OUTDOOR FLOWER ARRANGEMENTS
Filed March 9, 1970  2 Sheets-Sheet 1

INVENTOR
CLARICE W. SHACKELFORD

BY Colton + Stone

ATTORNEYS.

Oct. 12, 1971  C. W. SHACKELFORD  3,611,633
METHOD AND APPARATUS FOR OUTDOOR FLOWER ARRANGEMENTS
Filed March 9, 1970  2 Sheets-Sheet 2

INVENTOR
CLARICE W. SHACKELFORD

BY Calton + Stone

ATTORNEYS.

United States Patent Office 3,611,633
Patented Oct. 12, 1971

3,611,633
METHOD AND APPARATUS FOR OUTDOOR
FLOWER ARRANGEMENTS
Clarice W. Shackelford, 3628 13th St. NW.,
Washington, D.C. 20010
Filed Mar. 9, 1970, Ser. No. 17,477
Int. Cl. A01g 9/02
U.S. Cl. 47—34                                9 Claims

ABSTRACT OF THE DISCLOSURE

A plant receptacle which, individually, combines the functions of a miniature hothouse, a planter and a transplanting container; and, in conjunction with other like receptacles, may be used to define desired plant growth patterns such as in the case of flower arrangements for parks, yards and the like. A transparent receptacle and closure define, in effect, a miniature hothouse which is provided with a plurality of perforated tubular members depending therefrom for the combined purposes of anchoring the receptacle in a desired location, permitting plant root growth exteriorly thereof and permitting ingress of ground moisture thereinto and drainage therefrom.

BACKGROUND OF THE INVENTION

The invention relates to an improved method and apparatus for producing aesthetically pleasing planting arrangements and, more particularly, outdoor flower arrangements. The practice of the invention also provides a decorative, protective housing for germinating seeds, a protective barrier for the resultant young plants and makes possible an earlier flowering of the plants than would normally be consistent with conventional planting procedures having regard to the growing season of a particular locale.

Conventional methods of producing outdoor flower arrangements have ranged from the use of surveying equipment in commercial landscaping layouts, such as in city parks or the like, to the determination of planting sites by visual inspection alone. The latter method may involve initially marking the soil as a pattern for a planting operation or the earth may be actually tilled in accordance with a mental impression of the arrangement to be planted. The faithful reproduction of a mental impression as a relatively simple planting arrangement presents no particular problem to professionals skilled in the art of landscaping and gardening; however, relatively complex arrangements are often difficult if not impossible to obtain absent some preplanting arrangement which will involve, at the least, pre-marking of the earth to define the tillage areas. In the case of the average homeowner who is not skilled in gardening the simplest arrangements may be well nigh impossible to even visualize. Consequently, the majority of homeowners normally content themselves with the tillage of a generally rectangular area to define a flower bed after which time the seeds or young flowers are usually arrayed in straight rows within the bed. While such typical flower beds may fulfill the desire for residential flora, generally, the typical homeowner is simply incapable of producing unusual or complex arrangements comparable to the aesthetically pleasing arrangements achieved by professional gardeners. Even such professionals may spend an inordinate amount of time planning an arrangement so that a method of laying out a readily discernible pattern more nearly representative of the positions to be occupied by fully grown plants would represent a substantial saving in time.

Quite apart from the foregoing problems inherent to flower arrangements, in general; are the difficulty in the protection of flower beds, particularly during the early planting stages, from destruction by children or animals and the death of the young plants by frost, root rottage and/or insufficient moisture. Because of the natural desire of a homeowner for early flowering there is a tendency to plant too early in the season with the concomitant likelihood of damage by frost. Consequently, some persons commence the germination of plants indoors during the early spring for the purpose of later transplanting to an outdoor bed which frequently results in what is known as shock transplanting and death of the plants.

SUMMARY OF THE INVENTION

The method aspect of the invention involves the planting of seeds or slips in decorative, protective receptacles which receptacles may then be anchored to the ground in any desired arrangement.

The novel receptacles are, in effect, miniature hothouses when their closure members are in place. With their closures removed, the receptacles function more in the nature of an open planter.

Both the receptacles and closure members are preferably formed from a transparent plastic material although the receptacle body could be constructed from an opaque or translucent material, if desired, with the transparent closure providing the hothouse effect. The lower receptacle body wall is provided with a plurality of perforated anchoring tubes having one end in open communication with the receptacle interior and extending downwardly to terminate in an earth piercing end which may be either open or closed, as desired, in accordance with soil conditions within or without the receptacle as will be subsequently explained. Each anchoring tube contains a multiplicity of wall perforations intermediate its ends which permit plant root growth exteriorly of the receptacle and the passage of moisture both into and out of the same.

It is desirable that the receptacles, themselves, be clearly visible when anchored to the earth so that they are not inadvertently stepped upon and such ready visibility may be imparted to the otherwise transparent receptacles in a variety of ways to produce a decorative effect even before the growth or flowering of the plants. They may, for example, consist of colored transparent plastic, in whole or in part; or decorative designs such as decals or the like may be applied to their exterior surfaces.

In one aspect of the invention, the decorative receptacles are filled with a quantity of soil and plant nutrients, seeds are planted therein and the receptacles are arranged in a desired outdoor pattern representing a flower arrangement. Because of the unit-handled capability of the receptacles they may be readily moved about until the desired arrangement is achieved and thereafter anchored in such arrangement by forcing the anchoring tubes downwardly into the earth. It will thus be apparent that the only mental impression that must be relied upon to obtain the desired arrangement is the number and type of plants to be grown in each receptacle since the overall arrangement may be effected by trial and error to achieve the desired pattern with individual ones of the receptacles being moved about as desired in relation to the remaining ones until a suitable arrangement is achieved. The contrast with conventional planting methods is apparent upon recognition of the fact that once the seeds are conventionally planted within a tilled area a visual inspection of the area reveals no more information as to the ultimate growth pattern than was apparent from viewing the tilled area alone and, further, the seeds cannot be moved about once they are planted since their precise positions are not known. Through the use of the unit-handled receptacles the completed growth pattern can be readily viewed and altered as desired if the receptacle array does not correspond with the desired mental impression. Furthermore, at least during the initial germination period and before the plant roots grow outwardly of the receptacles, the same may yet be rearranged. In the case of early planting, the closure members will be applied for the achievement of a miniature hothouse effect which, with condensate forming on the inside of the closures, will provide the necessary heat and moisture for the seeds to germinate. The closures additionally serve to protect the seeds and young plants from destruction by birds or other animals. After the young plants have achieved a sufficient degree of growth the closures are removed and the receptacles function in a manner quite similar to the usual tilled bed area and, additionally, provide readily visible physical barriers surrounding the same which serve as reminders to children and others of the location of the plants.

During the early stages of growth it may be desirable to add water from time to time and the apertured anchor tubes insure that excess moisture may drain off thus insuring against root rottage. When climatic and soil conditions are such that additional watering would not normally be required, the apertured anchor tubes insure that ground moisture may reach the plants.

Another manner in which the receptacles may be used to achieve early flowing is to commence the seed germination and plant growth indoors under proper conditions of heat, light, etc. and later transplant the total receptacle to an outdoor location which greatly reduces the likelihood of plant damage due to shock transplanting. More specifically, the receptacle may be used simply as an indoor planter, per se, during the initial germination and growth periods or the same may be placed in a larger container such as a vermiculite filled box or the like prior to its transplantation to an outdoor location.

Whatever method of initial plant starting is utilized, the immediately surrounding soil within the receptacle tends to become compact as the plants mature and roots are sent out which find their way through the anchor tube apertures seeking soil moisture and oxygen. This serves to further anchor the receptacles and insure against their being upset by wind, animals or the like.

During the winter months, the receptacles may serve an entirely different function in preparation for a later planting period, viz. the production of compost. Thus leaves, grass, peat or the like may be placed in the covered receptacles and left outdoors. The resultant compost may then be used to mix with soil for planting at a later time.

As a further aid in achieving symmetrical planting within each of the receptacles, themselves, either the closures or the body portions of the receptacles may be provided with indicium in the form of structural patterns or numerals. Preferably, the receptacle and its closure are provided with mating geometrical patterns which not only enhance the decorative effect but, also, delimit a preferred plant spacing arrangement within the receptacle and provide a better frictional fit between the receptacle body and closure which, in effect, precludes their separation by shear forces such as would be imparted by ground winds.

Where a particular variety of soil having a very low angle of repose, such as sandy loam, is to be used within the receptacles and the germination and initial growth is to take place indoors it may be desirable to use anchor tubes having a closed lower end to prevent possible soil loss during movement. In most cases, however, the lower tube ends should be open to facilitate their insertion into the soil and provide better access for soil fluids between the surrounding and receptacle contained soil.

The container, of course, may assume any of a variety of desired shapes consistent with their more obvious functions of facilitating the visualization of a growth pattern once they are laid out in a proposed array and the presentation of an overall pleasing appearance prior to the time the plants flower. In most cases these functions are readily achieved by receptacles having regular geometrical shapes such as rectangles or the like however more unusual arrangements may be achieved by the use of a single receptacle, itself, such as one having a generally toroidal shape, for example.

DESCRIPTION OF THE DRAWINGS

The purposes and advantages of the invention will become more apparent from the following description when considered in conjuction with the drawings, wherein.

DESCRIPTION OF THE PREFERRED EMBODIMENTS

Figure 1:
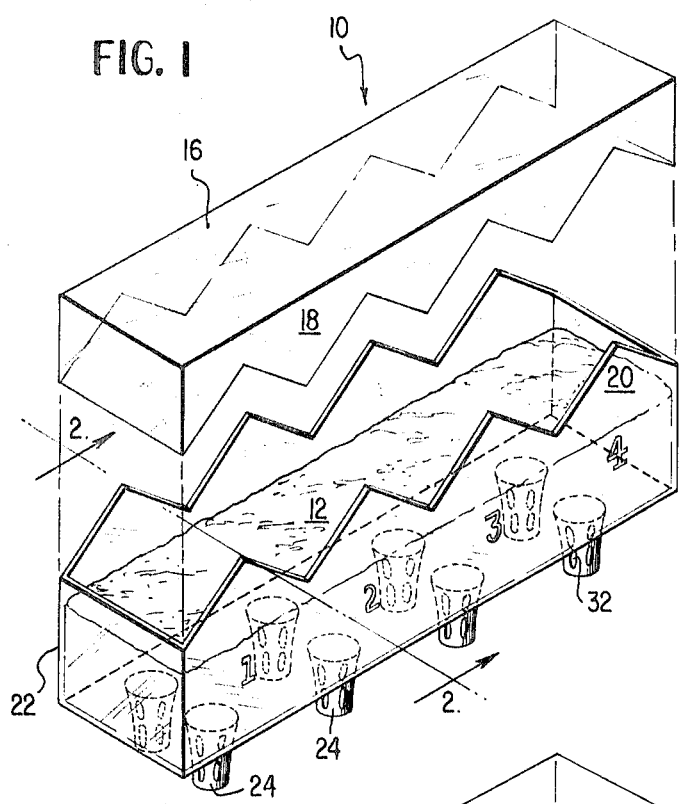
FIG. 1 is a perspective view of a plant receptacle constructed in accordance with one embodiment of the invention and depicting a plurality of seeds planted therein.
Figure 2:
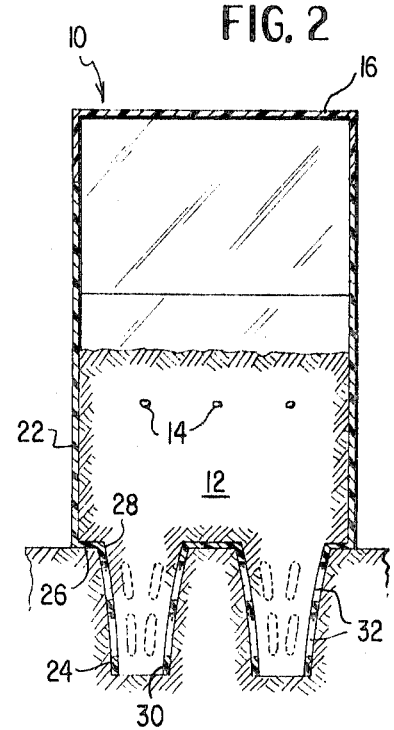
FIG. 2 is a cross-sectional view taken along line 2—2 of FIG. 1 with the closure in place on the receptacle body.

A first embodiment of the invention is depicted in FIGS. 1 and 2 as comprising a transparent receptacle 10 containing a quantity of soil and plant nutrient 12 having planted therein a generally symmetrical array of flower seeds 14. Closure member 16 includes downwardly extending serrated side walls 18 interfitted with corresponding serrations on upstanding side walls 20 of receptacle body member 22. A plurality of anchor tubes 24 extend downwardly from receptacle bottom wall 26 and establish open communication with the contents of receptacle 10 via open tube ends 28, 30 and apertures 32 formed in the walls of tubes 24. The anchor tubes may be formed or cast integrally with receptacle 10 or separately formed for subsequent insertion into appropriate openings formed in bottom wall 26.

Figure 3:
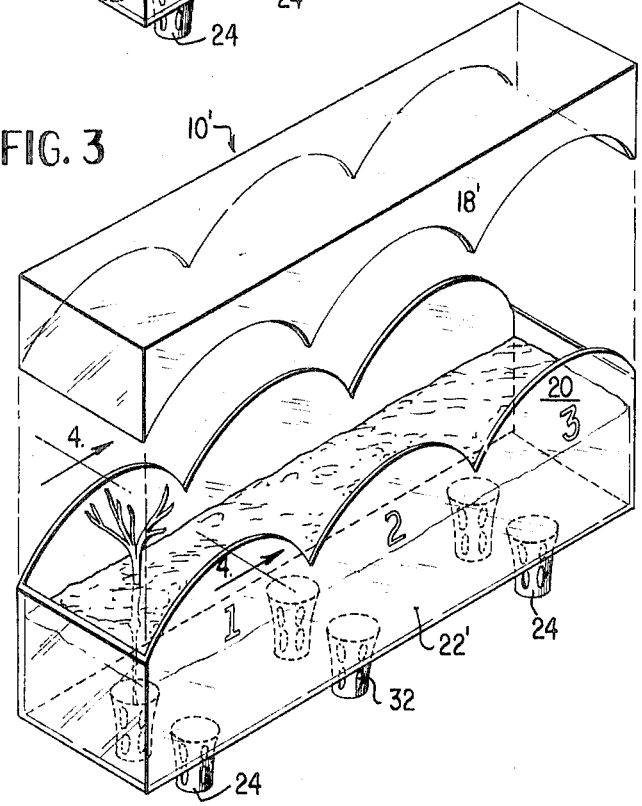
FIG. 3 is a perspective view of a modified plant receptacle.
Figure 4:
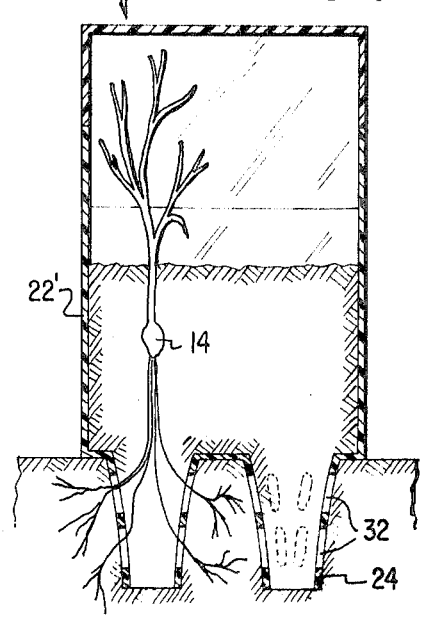
FIG. 4 is a cross-sectional view taken along line 4—4 of FIG. 3 with the closure in place on the receptacle body.

The embodiment shown in FIG. 3 differs from that of FIG. 1 only in the mating scallops between the closure side walls 18' and side walls 20' of body member 22'. FIG. 4 shows the receptacle 10' anchored to the earth by anchor tubes 24 and illustrates the manner in which roots of sprouting seeds 14 extend through anchor tube apertures 32 in search of ground moisture.

Figure 5:
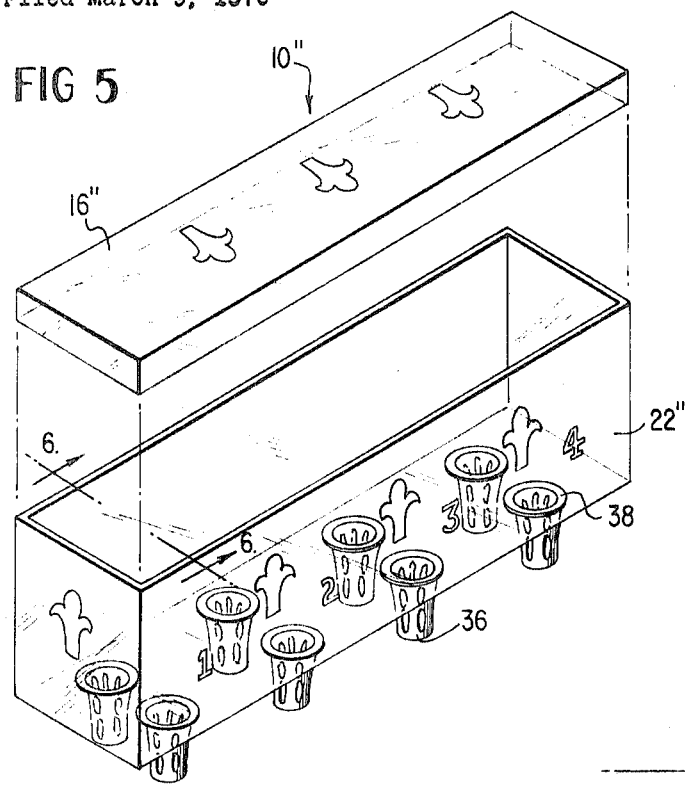
FIG. 5 is an exploded perspective of a third modification.
Figure 6:
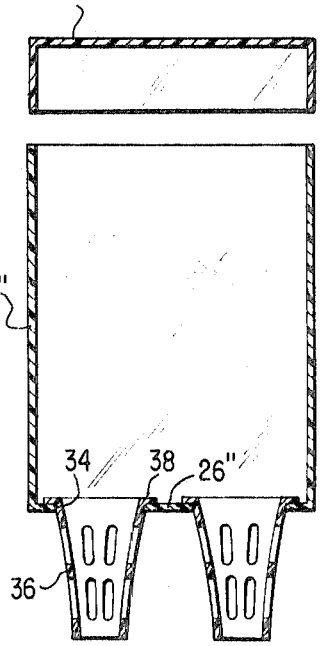
FIG. 6 is a cross-sectional view taken along line 6—6 of FIG. 5 with the closure in place on the receptacle body.

In FIG. 5 is illustrated a third embodiment wherein closure 16" and body member 22" have generally coplanar engaging portions. Receptacle 10" is initially formed with bottom wall openings 34 for the reception of separately formed anchor tubes 36 having peripheral flanges 38 to engage the upper surface of bottom wall 26". Thus, in the FIG. 5 embodiment, body portion 22" is first placed at a desired ground engaging location, anchor tubes 36 are forcibly inserted through bottom openings 34 into the ground, soil is placed in the body member, the seeds are planted and the closure member applied.

Although a similar procedure may be followed with the FIGS. 1 and 2 embodiments having integrally formed anchor tubes, the receptacles 10 and 10' are normally filled with soil and the seeds implanted prior to their anchoring to the ground.

Each of the receptacles shown in FIGS. 1, 3 and 5 may have indicia applied to the outer surface thereof, such as the numerals 1-4, to indicate the appropriate spacing for a particular row or rows of seeds or cuttings.

Figure 7:
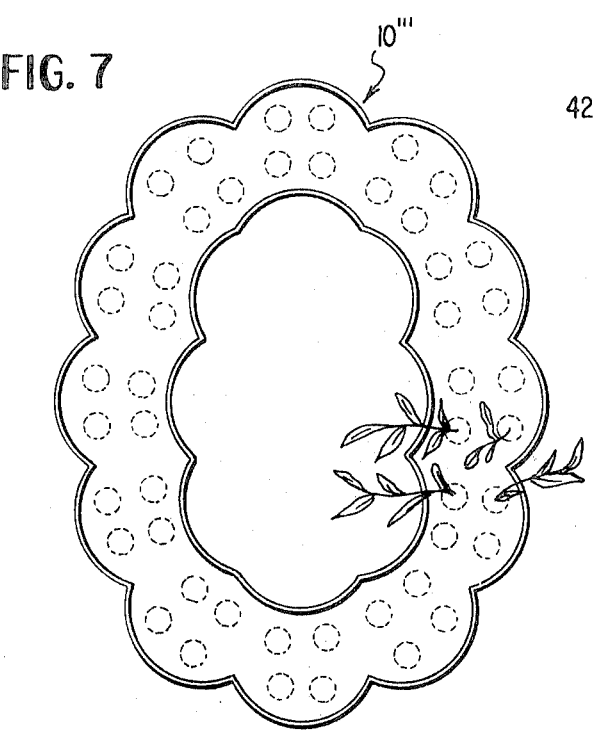
FIG. 7 is a schematic top plan view of a fourth modification exhibiting a generally toroidal configuration.

In FIG. 7 is illustrated, in plan, a generally toroidal, scalloped receptacle 10''' containing flowering plants.

It will, of course, be understood that a similarly shaped transparent closure is provided for receptacle 10''' as are the appropriate anchor tubes which function in the same manner and for the same purpose as described in connection with the embodiments of FIGS. 1–4.

A very important aspect of the invention is the incorporation of readily visible means with each of the transparent receptacles. In FIGS. 1, 3 and 7 the readily visible means takes the form of a colored transparent plastic used to form the same while the FIG. 5 embodiment illustrates design figures applied to an otherwise clear plastic receptacle. Although it would be appreciated that an important function of such coloration and design application is to produce a decorative effect to the planter arrangement prior to the flowering period, the primary function is to make the same visible without destroying the hothouse effect so that persons, and particularly children, will be reminded of their location and thus may be able to avoid their destruction.

In use, the seeds will normally be planted in the soil contained within a receptacle and the receptacle immediately anchored to the earth at a point in time prior to the normal planting season whereupon the hothouse effect will provide sufficient heat and moisture for the seeds to germinate. After the seeds have sprouted and the danger of frost abated, the closures are removed and the plants will flower in a normal manner while sending out rots through the anchor tubes to penetrate the earth. Excess water that is supplied to the receptacles may drain therefrom through the anchor tubes thus avoiding root rottage while insufficiently watered plants may receive ground moisture moving upwardly through the tubes. Alternatively, the receptacles may be planted and maintained indoors, without their closures, either within or without an outer container of fluent material such as vermiculite or earth, until such time as outdoor planting is desired. At this time the receptacles containing the maturing plants may be anchored to the earth thus avoiding the usual shock transplanting associated with removal from a conventional hothouse bed and resetting in the earth.

It is readily apparent that different colored receptacles may be chosen for use with various color flowering plants for the purpose of achieveing desired color contrasts.

Figure 8:
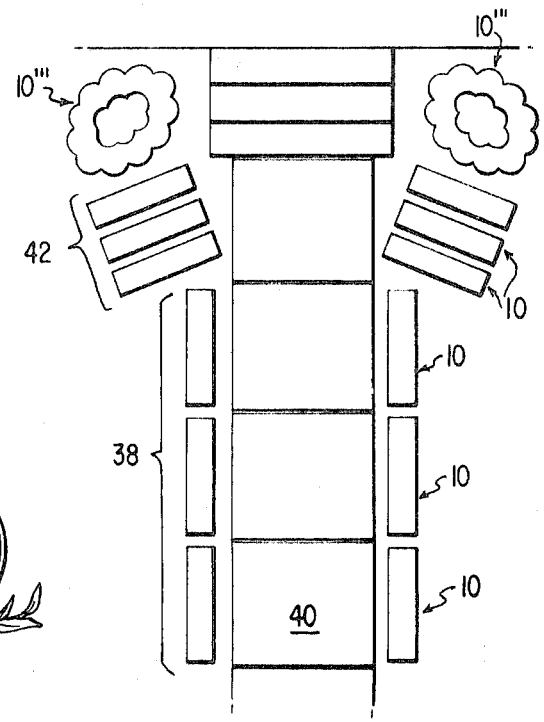
FIG. 8 is a schematic illustration of one outdoor planting arrangement which is greatly facilitated by the practice of the method described herein.

Exemplary of a very simple flower arrangement which would, nevertheless, be very difficult to layout by conventional methods is that shown in FIG. 8 wherein a sidewalk is lined with flowers which flower lines diverge outwardly adjacent the steps to terminate in a circular arrangement. More specifically, a first group 38 of planted receptacles 10 are aligned on either side of a sidewalk 40. A second group 42 of receptacles 10 are fanned out into a divergent relationship at one end of the walk and toroidal receptacles 10''' positioned at the end of each group 42. In making this arrangement, each of the receptacles may, initially, be less than fully anchored to the ground to permit easy removal. After the positionment of the receptacles, a visual inspection will determine whether the desired symmetry has been achieved and, if not, appropriate ones of the receptacles may be moved until the desired arrangement is achieved as determined by an overall viewing of the layout which permits one to accurately visualize the ultimate flowering arrangement.

What is claimed is:

1. A planting receptacle adapted for use with a plurality of similar receptacles in the formation of a planting arrangement, comprising; at least one soil containing peripheral wall portion merging with a bottom wall portion, a plurality of hollow anchor tubes extending downwardly from said bottom wall portion for anchoring said receptacle to the earth and having their hollow interiors in open communication with the interior of said receptacle, and a plurality of tube wall apertures in each of said anchor tubes for permitting root growth from said receptacle into the earth.

2. The receptacle of claim 1 wherein said receptacle includes a transparent closure member adapted to engage said one wall portion and produce a hothouse effect within the receptacle.

3. The receptacle of claim 2 wherein said peripheral wall portion is transparent, and means for rendering readily visible at least one of said closure member and peripheral wall portion.

4. The receptacle of claim 3 wherein said means includes a design pattern overlying at least one of said closure member and peripheral wall portion.

5. The receptacle of claim 2 wherein said transparent closure member is colored for making the same readily visible.

6. The receptacle of claim 5 wherein said peripheral wall portion is formed from a transparent colored material for increasing the hothouse effect and ready visibility of the receptacle.

7. The receptacle of claim 6 wherein said peripheral wall portion is generally rectangular and said anchor tubes are integral with said bottom wall.

8. The receptacle of claim 5 wherein said peripheral wall portion surrounds and is interconnected by said bottom wall with a second soil containing wall portion to define a generally toroidal shaped receptacle.

9. The receptacle of claim 2 including interfitting projections between said one wall and closure member.

References Cited

UNITED STATES PATENTS

| | | | |
|---|---|---|---|
| 1,221,449 | 4/1917 | Hitchcock | 47—38.1 |
| 2,812,102 | 11/1957 | Caplinger | 47—34 X |
| 3,112,577 | 12/1963 | Burger | 47—37 |
| 3,199,250 | 8/1965 | Sawyer | 47—1.2 |
| 3,552,058 | 1/1971 | Fici | 47—38 |

FOREIGN PATENTS

| | | |
|---|---|---|
| 412,853 | 7/1934 | Great Britain. |
| 640,756 | 1/1937 | Germany. |

ROBERT E. BAGWILL, Primary Examiner

U.S. Cl. X.R.

47—29